Figure 1:
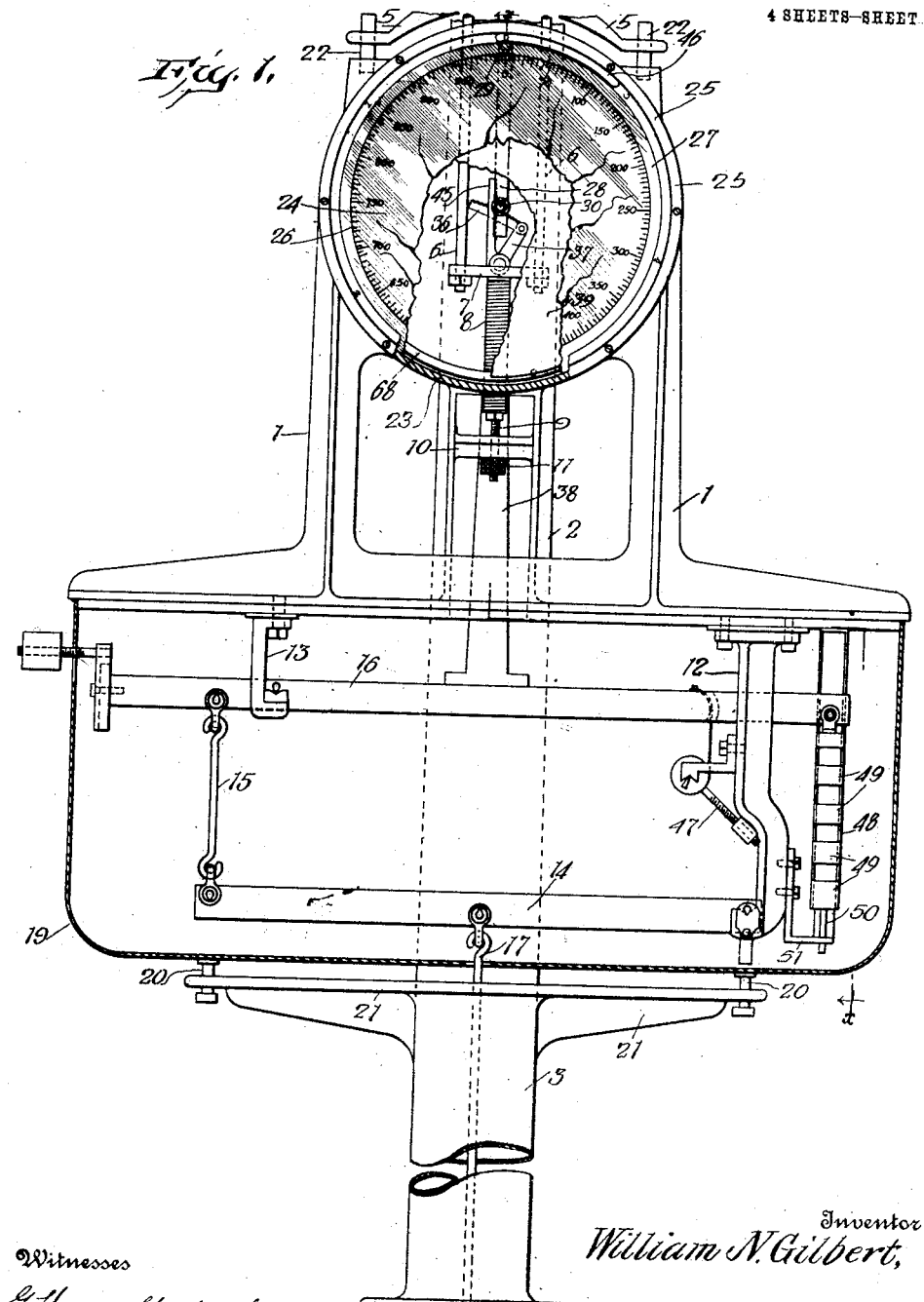

W. N. GILBERT.
SCALE.
APPLICATION FILED DEC. 19, 1910.

1,106,799

Patented Aug. 11, 1914.
4 SHEETS—SHEET 1.

Witnesses
G. Howard Walmsley
Edward Reed

Inventor
William N. Gilbert,
By H. A. Toulmin,
Attorney

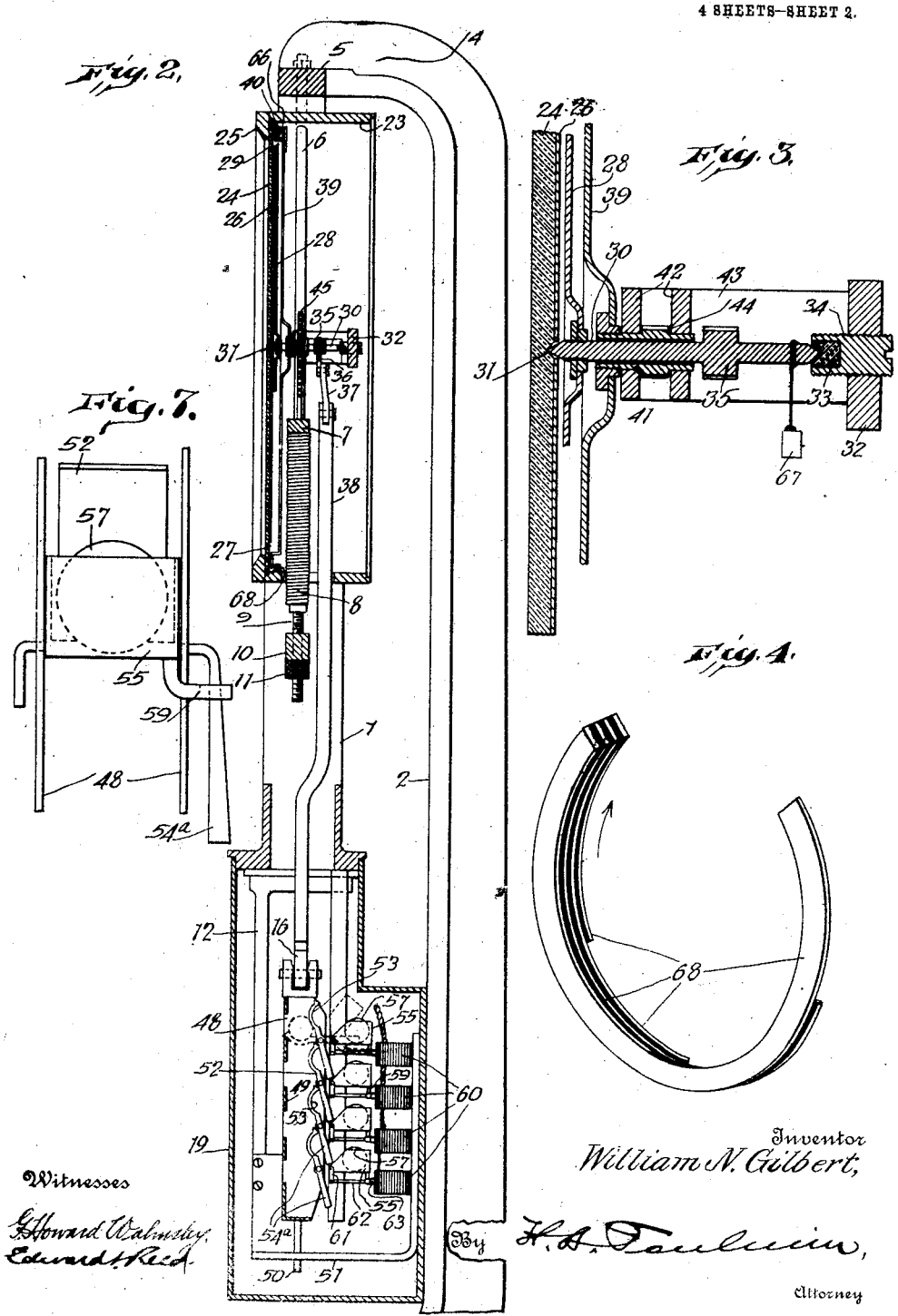

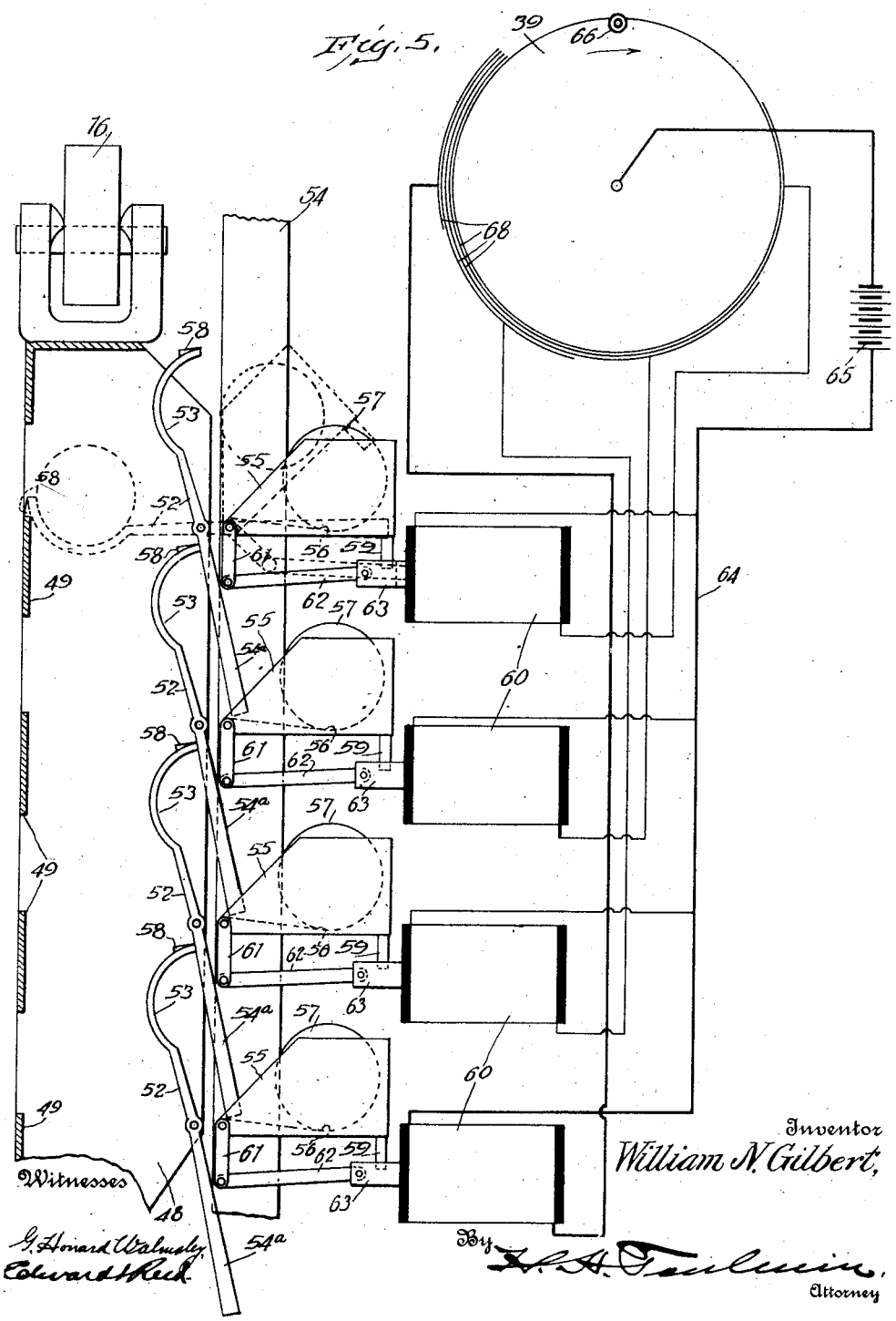

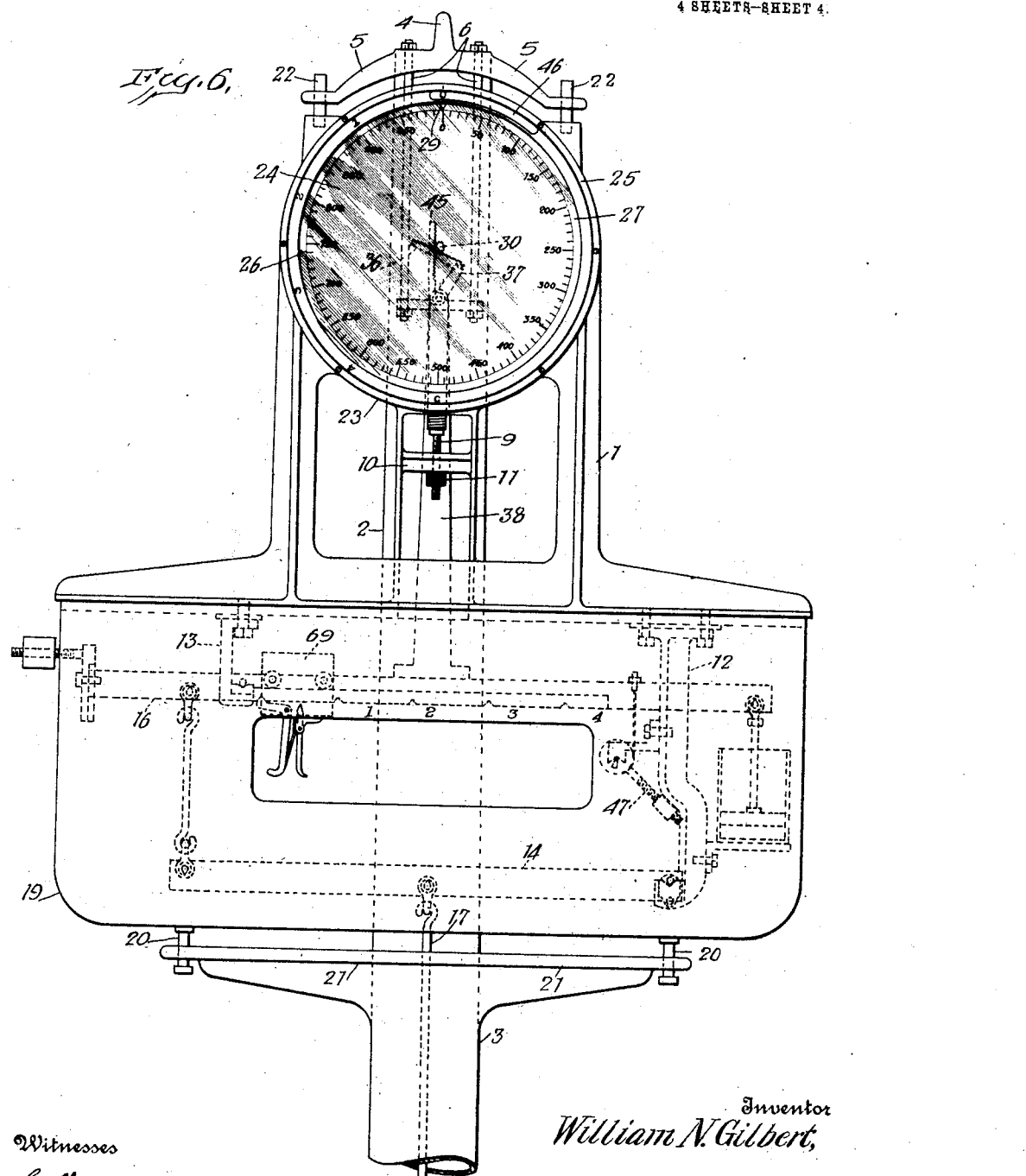

UNITED STATES PATENT OFFICE.

WILLIAM N. GILBERT, OF SPRINGFIELD, OHIO.

SCALE.

1,106,799.  Specification of Letters Patent.  Patented Aug. 11, 1914.

Application filed December 19, 1910. Serial No. 598,157.

*To all whom it may concern:*

Be it known that I, WILLIAM N. GILBERT, a citizen of the United States, residing at Springfield, in the county of Clark and State of Ohio, have invented certain new and useful Improvements in Scales, of which the following is a specification, reference being had therein to the accompanying drawings.

This invention relates to scales and more particularly to platform scales employing an integer indicator and a fractional indicator.

The object of the invention is to provide such a scale which will be either wholly or partly automatic in its operation and which, when the load is balanced, will indicate on the two indicators the exact weight of the load.

It is also an object of the invention to provide such a scale in which the fractional indicator is controlled by means of a beam to which weights may be automatically applied to balance the weight on the scale.

A further object is to mount the two indicators about a common axis and operate them both from a single operating member.

In the accompanying drawings, Figure 1 is a front elevation of a portion of the scale embodying my invention; Fig. 2 is a vertical, sectional view, taken on the line $x\ x$ of Fig. 1; Fig. 3 is a sectional, detail view of the shafts and bearings for the indicators; Fig. 4 is a detail view of the fixed contact rings; Fig. 5 is a detail view of the automatic mechanism for adjusting the counterpoise weights on the beam; Fig. 6 is a front elevation of a slightly modified form of the invention, and Fig. 7 is a rear elevation of a portion of the counter-poise frame, showing one of the weight receptacles.

In these drawings I have illustrated two embodiments of my invention, one of which is wholly automatic in its action and the other of which is automatic in part of its action. The main features of construction in both forms of the device are identical, and, in each instance, the mechanism is mounted upon a frame 1 which is suspended from a vertical standard 2 extending upward from the pillar 3 of a platform scale. This standard is provided with a forwardly extending projection 4 having transverse portions 5 through which extend bolts 6, the lower ends of which extend through and support a transverse bar 7. A spring 8 is connected at its upper end to the bar 7 and has secured to its lower end a bolt 9 which extends through a cross bar 10 forming a part of the frame 1 and is adjustably secured thereto by a nut 11. Depending from the frame 1 on opposite sides of the center thereof are two brackets 12 and 13. The bracket 12 extends some distance below the bracket 13 and forms a support for one end of an even lever 14, the opposite end of which is connected by a link 15 with one end of a beam 16 which is pivotally mounted on the bracket 13. The even lever 14 is connected with the platform of the scale through a connecting rod 17 which constitutes the operating member for both the indicators.

Inasmuch as the construction and operation of the platform scale are well known I have here shown only the pillar 3 and connecting rod 7 of that scale, as these are the only parts necessary to an understanding of the present invention. It will be apparent that when a load is placed upon the scale it will be transmitted through the connecting member 17 to the indicating devices and the frame 1 as a whole will move downward against the tension of the spring 8 and the beam 16 will move about its pivotal center. The even lever 14, beam 16 and their co-operating parts are inclosed in a housing 19 which is provided at its lower end with guide pins 20 extending through openings in laterally extending arms 21 carried by the pillar 3 and coöperating with the pins 22 carried by the upper portion of the frame and extending through openings in the transverse portions 5 of the standard 2, to maintain the frame in proper relation to the pillar and the scale.

The indicating devices comprise an integer indicator which indicates the weight in units of large denominations, such as one thousand pounds, and a fractional indicator, which indicates the weight in fractions of the unit indicated by the integer indicator, such, for example, as units of five pounds each. The two indicators are mounted within a casing 23 supported by the frame 1 and preferably cylindrical in shape. The front of this casing is closed by a plate of heavy glass, 24, about the face of which extends a sash or frame 25 which, in addition to securing the plate in position, also extends a short distance inward from the casing and conceals a portion of the glass for a purpose which will hereinafter appear. A dial 26 is mounted within the casing adjacent to the glass 24 and is provided with graduations of five pounds each. This dial is fixed with relation to the casing and also serves to conceal from view other parts of the mechanism inclosed in the casing. The dial 26 is slightly smaller in diameter than the sash 25, thus leaving an annular strip of glass between the dial and the sash, as indicated at 27. A suitable pointer travels about the edge of the dial and is visible through this annular portion of the glass and is so controlled as to indicate on the dial the fractional weight of the load. As here shown, this pointer is in the shape of a rod 28 extending radially to the dial and having its outer end turned inward and pointed, as indicated at 29. The other end of the pointer 28 is rigidly secured to the shaft 30, the movement of which is controlled by the movement of the beam 16.

In order that the registration may be accurate it is desirable that the frictional resistance to the movement of the shaft 30 should be as small as it is possible to make it and I have, therefore, provided practically frictionless bearings for this shaft. For this purpose both ends of the shaft are pointed and the forward end is mounted in a recess 31 formed in the center of the plate of glass 24, which forms a support for the adjacent end of the shaft. The opposite end of the shaft 30 is mounted in a bearing carried by a transverse bar or frame member 32 extending across the casing 23 near the rear wall thereof and rigidly supported with relation thereto. As here shown, this bearing comprises a recessed block 33 of agate or similar material mounted in a plug 34 which is screw-threaded in the transverse bar 32, thus enabling the bearing to be adjusted with relation to the shaft. Rigidly secured to the shaft 30 is a pinion 35 with which meshes a rack 36 carried by the arm 37 secured to the upper end of a standard 38 which is rigidly secured to and supported on the beam 16. The rack 36 is preferably segmental and is here shown as curved to conform to the arc of a circle described about the pivotal center of the beam 16. Consequently, it will be apparent that the rise and fall of the beam will cause the rack to travel over the pinion and thereby rotate the shaft and the pointer, the rotation of the shaft and the travel of the pointer being proportionate to the amount of movement imparted to the beam. The integer indicator comprises a rotatable member or wheel 39 having at its outer edge an annular portion upon which appear the several indications. In the present instance the wheel 39 has its outer portion bent forwardly and outwardly to form a flange 40 on which the indications 0, 1, 2, 3, 4 and 5 appear, the capacity of the present scale being limited to five thousand pounds. This indicator or wheel 39 is mounted on a hollow rotatable shaft 41 which preferably telescopes the shaft 30 and is journaled in laterally extending arms 42 carried by a bracket 43 extending forward from the transverse member 32 within the casing. A pinion 44 is rigidly secured to the shaft 41 and meshes with a vertical rack 45 rigidly secured to the transverse bar 7 which is fixed to the standard 2. Obviously, as the frame 1 rises and falls the pinion 42 will travel along the fixed rack 45 and will be rotated thereby, thus causing the integer indicator to rotate about the same axis about which the frictional indicator rotates. The sash or frame 25 which extends inward over the outer portion of the glass plate 24 conceals from view the figures on the integer indicator when the indicator is in its normal position. The sash is, however, provided with an elongated opening 46 arranged adjacent to and extending beyond the zero point on the fractional indicator dial. The arrangement of the figures on the integer indicator is such that when there is no load on the scale the zero of the integer indicator and the pointer for the fractional indicator will be arranged in the same vertical plane above the zero point on the dial 26. The length of the opening 46 in the sash 25 is such that the preceding figure will disappear beneath the sash simultaneously with or before the appearance of the succeeding figure at the upper end of the opening. Consequently, only one figure on the indicator wheel 39 will be visible at any time.

The movement of the beam 16 is controlled normally by a bobber 47. The limit of movement of the beam is such that when a load greater than one thousands pounds is placed on the scale, the beam will move far enough to carry the pointer completely around the dial and some distance past the thousand pound or zero point, thus indicating that the load on the scale is greater than a thousand pounds. At the same time the downward movement of the frame 1 will cause the integer indicator to rotate and the figure 1 will appear in the opening 46, or, if the weight is in excess of two thousand pounds, the figure 2 will appear in the opening 46. By then adjusting the poise or counterpoises on the beam 16 to balance the load on the scale, as indicated by the integer indicator, the fractional indicator will drop back to a point indicating the weight in excess of the weight indicated by the integer indicator. For example, if a weight of twenty-three hundred pounds is placed on the scale, the pointer will immediately revolve about its dial and stop at a point beyond the thousand pound point and the integer indicator will rotate to bring the figure 2 into alinement with the opening 46. As soon as the poise or counterpoises have been adjusted on the beam to counterbalance the two thousand pounds on the scale the pointer will drop back to three hundred pounds, thus indicating that the total weight of the load on the scale is twenty-three hundred pounds. This counterbalancing of the load may be accomplished either by a poise 69, as indicated in Fig. 6, which is moved along the beam by hand to the point indicated by the integer indicator, or it may be automatically controlled.

In that form of the device shown in Figs. 1 to 5, the beam is automatically controlled by applying thereto a series of weights or counterpoises. These weights and their application to the beam are controlled by the action of the integer indicating device. In the present instance four weights are employed, as this is sufficient to counterbalance the four thousand pounds which the scale will weigh in excess of the weight indicated by the fractional indicator. While the application of these weights to the beam may be controlled in any suitable manner I prefer to accomplish this by electrically actuated devices. In that form of the device here shown a supporting frame 48 is suspended from the extreme outer end of the beam 16 and comprises two parallel side members connected one to the other at their forward edges by transverse bars or plates 49 which form stops. To the lower end of this frame is secured a guide pin 50 which extends through an apertured bracket 51 carried by the bracket 12 on the frame 1. This supporting frame constitutes a counterpoise for the beam 16 and will balance a load of a thousand pounds. When the load is in excess of a thousand pounds additional weights are applied to the supporting frame to properly balance this excess load. In the present construction the supporting frame has pivotally mounted between its side members and near the rear edges of those members a series of plates 52 provided with recesses 53 which form pockets. Weights 54ª are connected with the plates 52 on the opposite sides of the pivotal centers thereof and on the outside of the frame members. These weights normally hold the plates in a substantially vertical position. A supporting frame 54 is carried by the frame 1 and extends immediately in the rear of the frame 48. This supporting frame has pivotally mounted thereon a series of receptacles 55, which may be of any construction suitable to support a weight. In the present instance the bottoms of the receptacles are inclined rearwardly and downwardly and are provided with recesses, which are indicated at 56. Mounted in each receptacle 55 is a weight, preferably spherical in shape, as indicated at 57, which rests normally in the recess 56. By moving the receptacle 55 about its pivotal center a distance sufficient to release the weight 57 from its recess this weight is caused to roll forward, engage the plate 52, move the same downward and enter the pocket 53 in said plate. The downward movement of the plate 52 is limited by a nose 58 coming in contact with one of the stops 49 on the frame 48 and supporting the plate in a substantially horizontal position. When in this position the weight or counterpoise 57 is supported wholly from the beam and there is no connection whatever between the receptacle 55 or its supporting frame and the frame or counterpoise. So long as the receptacle 55 is retained in its uppermost position the weight will rest upon the plate 52 and act upon the beam. When the receptacle is permitted to return to its normal or horizontal position a projection 59 depending from the rear end thereof will engage the weight 54ª which counterbalances the weight 52 and tend to move the same downward. The combined weights of the receptacle 55 and the weight 54ª are sufficient to overcome the weight of the counterpoise weight and move the plate 52 about its pivotal center, thereby causing the counterpoise weight to be discharged from the plate 52 into the receptacle 55. The movement of the receptacles 55 is preferably accomplished by the use of electro-magnets, and, in the present instance, I have shown solenoids 60 operatively connected with the respective receptacles. As here shown each receptacle has rigidly connected thereto an arm 61 which is connected by means of a rod 62 with the core 63 of its solenoid. Consequently, when the solenoid is energized and the core retracted the receptacle will be rocked about its pivotal center. One side of the circuit of each solenoid is connected with a main circuit 64 leading from a battery 65 and the other side of the circuit of each solenoid is connected with a suitable circuit breaker and closer, the action of which is controlled by the action of the integer indicating device. This circuit breaker and closer may be of any suitable character but I have here shown it as comprising a series of contact plates 68 arranged about the periphery of the integer indicator wheel 39 and adapted to be successively engaged by a contact, such as a roller 66 carried by the wheel 39. The contact plates are connected with the several solenoids in the order in which they are engaged by the roller 66. These plates which are preferably segmental in shape and extend about the periphery of the wheel 39 are insulated one from the other and from the casing 23 upon which they are mounted, while the battery 65 is connected with the frame 1 and through the hollow shaft 41 and wheel 39 with the contact roller. Each of the segmental contact plates has its forward end arranged at such point that it will be engaged by the contact roller simultaneously with the appearance of the corresponding figure on the wheel in the opening 46. The segmental contact plates preferably continue about the casing such a distance that the roller will not pass out of contact with any of the same until the load is removed from the scale and the roller moves rearwardly. The ends of the several plates preferably terminate some distance from the zero or normal position of the contact roller. Consequently, any rocking or idle motion of this roller during the loading or unloading of the scale will not cause the same to engage the contact plates. A weight 67 is suspended by a flexible cord from the shaft 30 to take up the lost motion and prevent vibration of the pointer 28.

In Fig. 6 of the drawings I have illustrated a slight modification of the invention, in which the operation, for the most part, is automatic, but in which the poise is adjustable along the beam by hand, the beam being provided with designations corresponding to those carried by the integer indicator. When a load is placed on the scale the operator notes the indication appearing in the opening for the integer indicator and adjusts the poise accordingly. With this exception the scale is wholly automatic. It will further be noted in this form of the device that I have placed the indications on one-half only of the indicator wheel, as this enables me to operate the device with a small amount of movement on the part of the frame. This, however, is optional.

The operation of the device will be readily understood from the foregoing description and it will be apparent that I have provided a scale which will automatically weigh loads of any size from five pounds to five thousand pounds; and that the indicators are so arranged with relation one to the other that the indications can be read practically simultaneously, thereby enabling the total weight to be read from what is in effect a single indicator.

It will be apparent that while I have, for the purpose of illustration, shown and described one form of this invention, with a slight modification thereof, the several parts of the device are capable of being materially altered without departing from the spirit of the invention, and I, therefore, wish it to be understood that I do not desire to be limited to the details of construction shown and described, for obvious modifications will occur to a person skilled in the art.

Having thus fully described my invention, what I claim as new and desire to secure by Letters Patent, is:—

1. In a scale, the combination, with a load-supporting frame having bodily movement, means to regulate the movement of said frame in proportion to the load thereon, a beam pivotally mounted on said frame and adjustable means to control the movement of said beam, of two indicators, the combined indications of which represent the total weight of the load on the scale, one of said indicators indicating a portion of said total weight in units and the other indicator indicating the remainder of said load in fractions of said units, means controlled by the movement of said frame to actuate one of said indicators, and means controlled by the movement of said beam relatively to said frame to actuate the other of said indicators.

2. In a scale, the combination, with a movable frame, and a beam pivotally mounted on said frame, two indicators carried by said frame, means to actuate one of said indicators by the movement of said frame, and means to actuate the other of said indicators by the movement of said beam relatively to said frame.

3. In a scale, the combination, with a fixed standard, a frame movably mounted on said standard, means to regulate the movement of said frame in proportion to the load thereon, a beam pivotally mounted on said frame, and a device to counterbalance said beam, of two indicators, the combined indications of which represent the total weight of the load on the scale, one of said indicators indicating a portion of said total weight of said load in units and the other indicator indicating the remainder of said load in fractions of said units, means to actuate one of said indicators by the movement of said frame, and means to actuate the other of said indicators by the movement of said beam relatively to said frame.

4. In a scale, the combination, with a vertical standard, a frame, a spring interposed between said frame and said standard to support the frame from the standard, a beam pivotally mounted on said frame, and adjustable means to control the movement of said beam, of two weight indicators, the combined indications of which represent the total load on the scale, one of said indicators indicating a portion of the load in units and the other of said indicators indicating the remainder of the load in fractions of said units, and means controlled by the movement of said frame and said beam for actuating the respective indicators.

5. In a scale, the combination, with a fixed standard, of a frame, a spring connecting said frame to said standard, a beam pivotally mounted on said frame, a lever pivotally mounted on said frame and connected to said beam, an operating member connected to said lever between its point of connection to said frame and to said beam, whereby the movement of said operating member will impart movement to said frame and to said beam relatively to said frame, and indicators adapted to be actuated by the movements of said frame and said beam, respectively.

6. In a scale, the combination, with a pillar having a vertical standard secured thereto, a bar suspended from the upper end of said vertical standard, a spring secured at its upper end to said bar, a frame connected with the opposite end of said spring, a beam pivotally mounted on said frame, a lever pivotally mounted on said frame and connected with said beam, a connecting rod connected with said lever between its points of connection with said beam and said frame, and indicators operatively connected with said frame and said beam and adapted to be actuated by the movements thereof.

7. In a scale, the combination, with two weight indicators, the combined indications of which represent the total weight of the load on the scale, of an operating member for said indicators, and actuating devices interposed between said operating member and the respective indicators, one of said devices comprising a beam, and means to automatically poise said beam.

8. In a scale, the combination, with a fixed standard, of a frame, a spring connecting said frame to said standard, a beam pivotally mounted on said frame, a lever pivotally mounted on said frame and connected to said beam, an operating member connected to said lever between its point of connection to said frame and to said beam, whereby the movement of said operating member will impart movement to said frame and to said beam relatively to said frame, and means for automatically poising said beam.

9. In a scale, the combination, with a fixed support, a frame movably mounted on said support, means to regulate the movement of said frame in proportion to the load thereon a beam pivotally mounted on said frame, and means for actuating said frame and said beam, of an integer weight indicator controlled by the movement of said frame, a fractional weight indicator controlled by the movement of said beam, the combined indications of said indicators representing the total weight of the load on the scale, and automatic means to poise said beam.

10. In a scale, the combination, with a fixed support, a frame movably mounted on said fixed support, means to regulate the movement of said frame in proportion to the load thereon a beam pivotally mounted on said frame, means for actuating said frame and said beam, an integer indicator controlled by the movement of said frame, a fractional indicator controlled by the movement of said beam, the combined indications of said indicators representing the total weight of the load on the scale, and means to automatically poise said beam.

11. In a scale, the combination, with two indicators, an operating member, and actuating devices interposed between said operating member and the respective indicators, one of said actuating devices comprising a beam, of means separate from said beam for automatically applying disconnected counterpoise weights to said beam.

12. In a scale, the combination, with two indicators, an operating member, actuating devices interposed between said operating member and the respective indicators, the actuating device for one of said indicators comprising a beam, of means controlled by the movement of the other indicator to poise said beam.

13. In a scale, the combination, with two indicators, an operating member, and actuating devices interposed between said operating member and the respective indicators, the actuating device for one of said indicators comprising a beam, of a supporting member carried by said beam, a plurality of counterpoise weights supported near said supporting member and automatic means for successively transferring said weights to said supporting member.

14. In a scale, the combination, with an integer indicator, a fractional indicator, and actuating devices for each of said indicators, the actuating device for said fractional indicator comprising a beam, of a supporting member connected with said beam and constituting a counterpoise, means for supporting weights adjacent to said supporting member, and means controlled by the action of said integer indicator to successively transfer said weights to said supporting member.

15. In a scale, the combination, with two indicating devices, coöperating to indicate the total load on the scale, one of said devices including a beam, of a supporting member connected with said beam and constituting a counterpoise, and means controlled by the action of the indicating device not including the beam to apply additional weight to said supporting member.

16. In a scale, the combination, with a beam, and a supporting member connected with said beam and constituting a counterpoise, of a series of weights, means to support each of said weights independently of the first-mentioned supporting member and of each other, and means other than said supporting member to automatically impart independent movement to said weights to transfer them separately to said supporting member.

17. In a scale, the combination, with a beam, and a supporting member connected with said beam and constituting a counterpoise, of a series of independently supporting weights and electrically controlled means to automatically impart independent movement to said weights and to transfer them bodily to said supporting member.

18. In a scale, the combination, with a beam, and a supporting member connected to said beam and constituting a counterpoise, of a plurality of independently operable weight-supporting devices arranged near said supporting member, a weight supported on each of said devices, and means other than said supporting member for automatically actuating said operable devices to transfer said weights bodily to said supporting member.

19. In a scale, the combination, with an indicator, an actuating device for said indicator comprising a beam and a supporting member connected with said beam, of a receptacle movably mounted adjacent to said supporting member, a weight carried by said receptacle, and means to automatically tilt said receptacle to cause said weight to move from said receptacle to said supporting member to poise said beam.

20. In a scale, the combination, with two indicators, actuating devices for said indicators, one of said actuating devices comprising a beam, and a supporting member connected with said beam, of a series of receptacles movably mounted adjacent to said supporting member, a weight mounted in each receptacle, and means controlled by the action of one of said indicators to actuate said receptacles to successively transfer said weights to said supporting member.

21. In a scale, the combination, with two indicators, actuating devices for said indicators, one of said actuating devices comprising a beam, and a supporting member connected with said beam, of a series of receptacles movably mounted adjacent to said supporting member, a weight mounted in each receptacle, an electro-magnet connected with each of said receptacles, a circuit for each of said magnets, and a circuit breaker and closer mounted in each of said circuits and controlled by the action of one of said indicators.

22. In a scale, the combination, with an integer indicator, a fractional indicator, an actuating device for each of said indicators, one of said actuating devices comprising a beam, and a supporting member connected with said beam, of a receptacle pivotally mounted adjacent to said supporting member, a weight carried by said receptacle, a solenoid having its core operatively connected with said receptacle and adapted, when energized, to move the same into position to discharge said weight onto said supporting member, a circuit for said solenoid, and a circuit breaker and closer for said circuit comprising a fixed contact member connected to one side of said circuit, and a movable contact member connected with one of said indicators.

23. In a scale, the combination, with an integer indicator and a fractional indicator, an actuating device for each of said indicators, one of said actuating devices comprising a beam, and a supporting member connected with said beam, of a series of receptacles pivotally mounted near said supporting member, a weight carried by each of said receptacles, a series of solenoids each having its core connected with the corresponding receptacle and adapted, when energized, to cause said receptacle to discharge its weight onto said supporting member, a circuit for each of said solenoids, a movable contact member connected with one side of each of said circuits and carried by one of said indicators, and a series of fixed contact members each connected with the other side of one of said circuits and arranged to be engaged successively by said movable contact member.

24. In a scale, the combination, with two indicators, an actuating device for each of said indicators, one of said actuating devices comprising a beam, a supporting member connected with said beam, and a series of supporting plates pivotally mounted on said supporting member, of a series of receptacles pivotally supported adjacent to said supporting member, a weight mounted in each of said receptacles, and means for actuating said receptacles successively to cause said weights to be discharged onto said pivoted plates.

25. In a scale, the combination, with two indicators, an actuating device for each of said indicators, one of said actuating devices comprising a beam, a supporting member connected with said beam, and a series of supporting plates pivotally mounted on said supporting member, of a series of receptacles pivotally supported adjacent to said supporting member, a weight mounted in each of said receptacles, means to actuate said receptacles to cause said weights to be discharged onto said plates, and means controlled by the downward movement of said receptacles to actuate said pivoted plates and return said weights to said receptacles.

26. In a scale, the combination, with an integer indicator comprising a rotary member and a fractional indicator, actuating devices for the respective indicators, the actuating device for said fractional indicator comprising a beam, and a supporting member carried by said beam and constituting a counterpoise, of a supporting frame arranged adjacent to said supporting member, a series of receptacles pivotally mounted thereon, a weight carried by each of said receptacles, an electro-magnet connected with each of said receptacles to move the same about its pivotal center and cause it to discharge its weight onto said supporting member, a circuit for each of said electromagnets, a movable contact member carried by the integer indicator and connected with one side of each of said circuits, a series of segmental contact plates mounted about the periphery of said rotary indicator, connected with the other sides of the respective circuits and adapted to be engaged successively by the contact member carried by said indicator.

27. In a scale, the combination, with two concentrically arranged separately operable indicators, of a single operating member for said indicators, and separate actuating devices interposed between said operating member and the respective indicators to cause one of said indicators to indicate the load on the scale in integers and to cause the other of said indicators to indicate the load in fractions of said integer.

28. In a scale, the combination, with a movable frame, an indicating device, means operated by the movement of said frame to actuate said indicating device, a beam pivotally mounted on said frame, and means for imparting movement to said frame and said beam, of a casing mounted on said frame, a dial supported near the front of said casing, a shaft rotatably mounted in said casing, a pointer carried by said shaft and arranged to travel about said dial, and means actuated by the movement of said beam for rotating said shaft.

29. In a scale, the combination, with a movable frame, a beam pivotally mounted on said frame, an indicating device, means operated by the movement of said frame to actuate said indicating device, and means for imparting movement to said frame and said beam, of a casing mounted on said frame, a dial supported near the front of said casing, a shaft rotatably mounted in said casing, a pointer carried by said shaft and arranged to travel about said dial, a standard rigidly secured to said beam, a rack carried by said standard, and a pinion on said shaft meshing with said rack.

30. In a scale, the combination, with a movable frame, a beam pivotally mounted on said frame, and means for imparting movement to said frame and said beam, of a casing, a glass plate forming the front wall of said casing, a dial arranged within said casing adjacent to said glass plate, a transverse bar carried by said casing, a shaft having one end mounted in a bearing formed in said glass plate and the other mounted in a bearing carried by said bar, a pointer carried by said shaft and coöperating with said dial, a pinion carried by said shaft, a standard rigidly secured to said beam, and a rack carried by said standard and meshing with said pinion.

31. In a scale, the combination, with a movable frame, a beam pivotally mounted on said frame, and means for imparting movement to said frame and said beam, of a casing, a glass plate forming the front wall of said casing, a shaft rotatably mounted in said casing, a pointer carried by said shaft, means for rotating said shaft, an indicator wheel mounted within said casing and rotatable about an axis coincident with the axis of said shaft, means controlled by the movement of said beam for rotating said shaft, and means controlled by the movement of said frame for rotating said indicator wheel.

32. In a scale, the combination, with a movable frame, a beam pivotally mounted on said frame, and means for imparting movement to said frame and said beam, of a casing, a glass plate forming the front wall of said casing and having a recess therein, a sash extending about said casing and overlapping said glass plate, an elongated opening in said sash, a dial mounted in said casing and arranged adjacent to said glass plate and of a diameter less than the internal diameter of said sash, a bearing mounted in said casing in the rear of said glass plate, a shaft having one end mounted in said bearing and the other end mounted in the recess of said glass plate, a pointer carried by said shaft and adapted to rotate about said dial, means controlled by the movement of said beam for rotating said shaft, an indicator wheel mounted within said casing and rotatable about an axis coincident with the axis of said shaft and having indications thereon normally concealed by said sash, and means controlled by the movement of said frame for actuating said indicator wheel.

33. In a scale, an indicator casing comprising a plate of glass forming the front wall thereof and having a recess therein, a transverse bar mounted in said casing, a bearing mounted in said bar, a shaft having one end in engagement with said bearing and the other end mounted in the recess in said glass plate, means for rotating said shaft, a dial mounted within said casing adjacent to said glass plate, a pointer carried by said shaft, bearing brackets supported from said transverse bar and extending about said shaft, a hollow shaft telescoping the first-mentioned shaft and rotatably mounted in said bearing brackets, an indicator wheel carried by said hollow shaft, and independent means for rotating said shaft and said hollow shaft.

34. In a scale, a movable frame, a beam pivotally supported on said frame, two indicators carried by said frame each comprising a shaft, a pinion carried by each of said shafts, a fixed rack meshing with one of said pinions, and a rack operatively connected with said beam and meshing with the other of said pinions.

35. In a scale, the combination, with a fixed support, a movable frame carried by said support, a beam pivotally mounted on said frame, two indicators carried by said frame, each comprising a shaft, and a pinion mounted on each shaft, a rack carried by said fixed support and meshing with one of said pinions, an arm secured to said beam, and a rack carried by said arm and meshing with the second of said pinions.

In testimony whereof, I affix my signature in presence of two witnesses.

WILLIAM N. GILBERT.

Witnesses:
E. F. McKEE,
EDWARD S. REED.